United States Patent [19]

Shugart

[11] 3,713,417
[45] Jan. 30, 1973

[54] AIR OPERATED ULTRASONIC TRANSDUCER

[76] Inventor: Michael E. Shugart, 3216 South Harlem Avenue, Riverside, Ill. 60546

[22] Filed: July 26, 1971

[21] Appl. No.: 165,479

[52] U.S. Cl. .................... 116/137 A, 43/124, 340/15
[51] Int. Cl. ............................................. B06b 3/00
[58] Field of Search .116/22 A, 137, 137 A, DIG. 18; 340/15, 56, 16; 43/17.1, 124

[56] References Cited

UNITED STATES PATENTS

| | | |
|---|---|---|
| 2,519,619 | 8/1950 | Yellott et al. .................... 116/137 A |
| 2,560,728 | 7/1951 | Lee .................... 116/137 A X |
| 3,156,212 | 11/1964 | Buell, Jr. .................... 116/137 A |
| 3,169,509 | 2/1965 | Rich .................... 116/137 A |
| 3,188,999 | 6/1965 | Baxter .................... 116/137 A |
| 3,259,103 | 7/1966 | Buell, Jr. et al. .................... 116/137 A |
| 3,533,373 | 10/1970 | King .................... 116/137 A |

Primary Examiner—Louis J. Capozi
Attorney—Snow & Benno

[57] ABSTRACT

A device to produce ultrasonic waves in the field of rodent and pest control. The device is a transducer which converts air under pressure to ultrasonic waves. Further the ultrasonic waves have constantly varying frequencies created by the pulsating admission of air under pressure to the system for more effective rodent and pest control.

10 Claims, 5 Drawing Figures

PATENTED JAN 30 1973
3,713,417
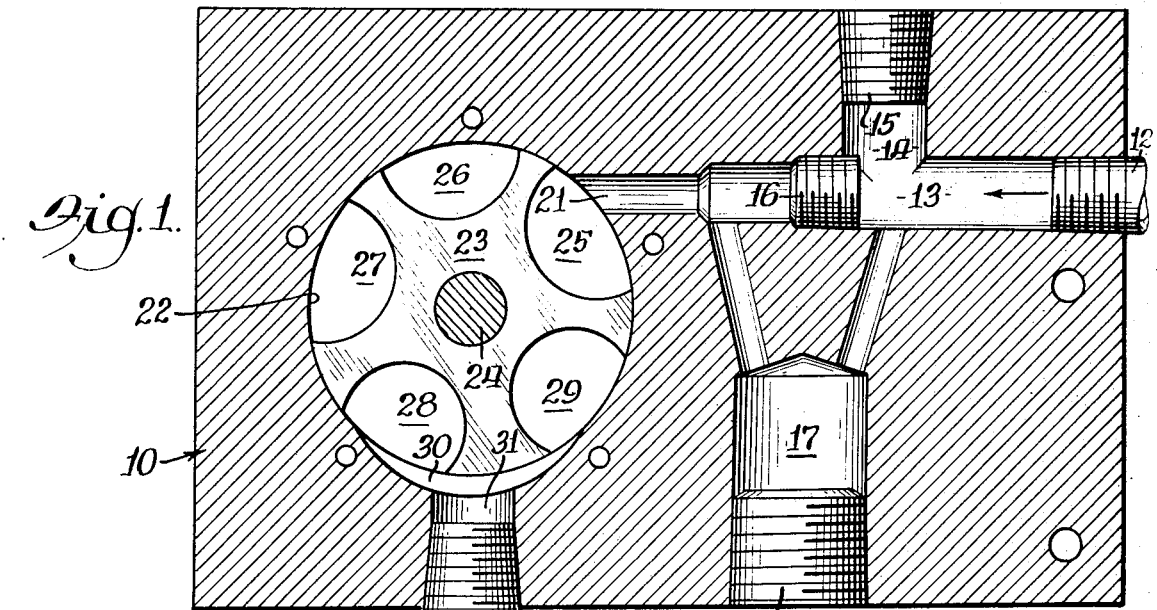
Fig. 1.
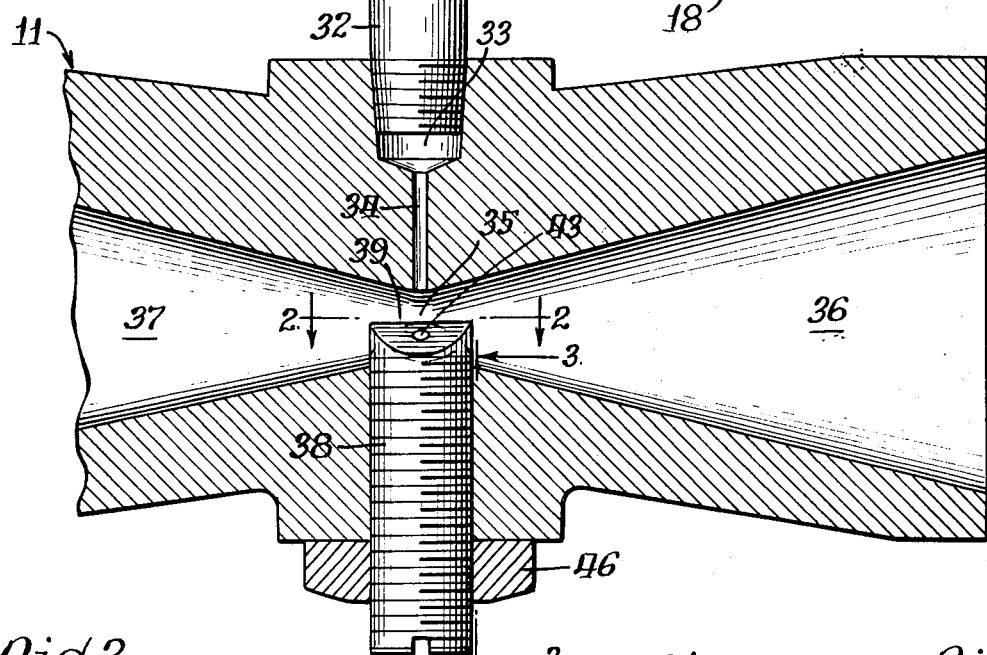
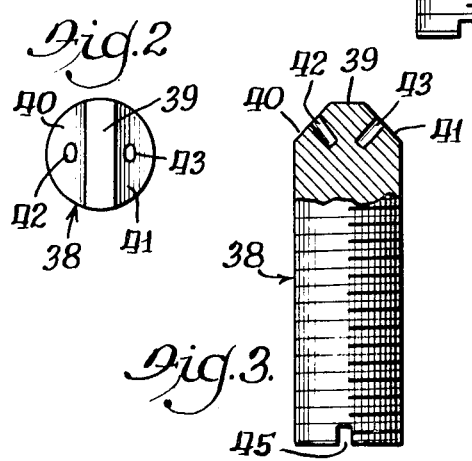
Fig. 2.
Fig. 3.
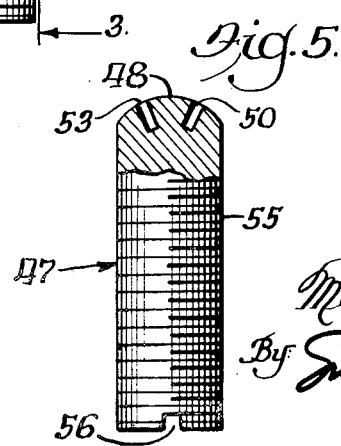
Fig. 5.
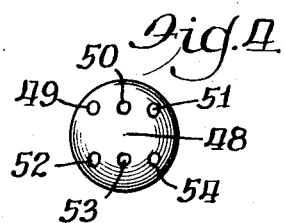
Fig. 4.
Inventor
Michael E. Shugart
By Snow and Benno
Attys 3,713,417

AIR OPERATED ULTRASONIC TRANSDUCER

BACKGROUND OF THE INVENTION

1. Field of the Invention

Ultrasonic waves have been used to control rodent populations. Although most ultrasonic frequencies are not audible to humans they are very obnoxious to rodents and other pests and have the marked tendency of ridding an area of such pests. Over the past number of years ultrasonic producing devices have been used to such a great extent in some communities that the rats and mice have become somewhat accustomed to certain ultrasonic waves and are able to tolerate those sounds. Various frequencies of ultrasonics have been employed in rodent control but to our knowledge no one has as yet created an ultrasonic producer which has a built in device to continuously vary the frequency. Tests have shown that rodents and such other pests which it is desired to control are least able to tolerate ultrasonics of varying frequencies ranging from 20,000 to 30,000 kilocycles.

2. Description of the Prior Art

The prior art shows horns and whistles have existed for many years. The generation of sound waves by an air jet goes back to at least 1936 in materials written by J. Hartmann in "The Hartmann Acoustic Generator," Engineering 142:491–1936, and "A New Acoustic Generator," J. Hartmann and Birgot Tralle. Both of these writings are of record in the U. S. Pat. Office. Hartmann taught the use of air jets of considerable velocity and even suggested pulsating or oscillating the air jets to produce or generate different sounds.

The patent to Yellott et al. U.S. Pat. No. 2,519,619 also defines an Acoustic Generator which has for its express object to stabilize the vibrations produced by an acoustic generator.

The patent to Buell, Jr. U.S. Pat. No. 3,156,212 discusses the use of a sonic generator for the control of rodents or other pests. The Buell, Jr. construction employs a nozzle and a resonator in a particular relationship which by air or other fluids creates non-audible sonic waves.

The Baxter U.S. patent No. 3,188,999 is another sonic generator used in pest control. Again a nozzle and resonator are employed to effect non-audible sonic waves so detrimental to rodents and other pests.

SUMMARY OF THE INVENTION

The present invention relates to a new and improved air operated ultrasonic transducer with means for pulsating the incoming air stream to produce a constantly varying ultrasonic frequency for rodent and pest control.

An important object of this invention is to provide an air operated ultrasonic transducer in which a pocketed rotor intercepts the incoming air jet and delivers it in pulsating bursts to the transducer.

Another important object of this invention is to provide a device as defined in the preceding object and further identified by the air jet causing rotation of the rotor and also charging each pocket with compressed air for subsequent delivery to the ultrasonic transducer.

Another and still further important object of this invention is the provision of an undercut in the rotor housing which spans at least two of the rotor pockets at the point of air delivery to the transducer.

Still another important object of this invention is to provide an integral air filter and dust collector disposed ahead of the delivery of air to the pocketed rotor.

Another and still further important object of this invention is to equip the transducer of this invention with an adjustable resonator plug.

Other and further important objects and advantages will become apparent from the following specification and the disclosures in the accompanying drawings.

IN THE DRAWING:

FIG. 1 is a transverse sectional view of the air operated ultrasonic transducer of this invention.

FIG. 2 is a top plan view of the resonator plug as taken on the line 2—2 of FIG. 1.

FIG. 3 is a side elevational view, partially in section, of the resonator plug of FIGS. 1 and 2 as taken on the line 3—3 of FIG. 1.

FIG. 4 is a top plan view of an optional form of resonator plug usable in the subject transducer.

FIG. 5 is a side elevational view, partially in section, of the optional resonator plug as shown in FIG. 4.

AS SHOWN IN THE DRAWINGS:

The reference numeral 10 indicates generally a housing in which pulsating air is developed and cleaned prior to delivery to a transducer housing 11. It is the transducer 11 which converts air under pressure to ultrasonic waves used in the control of rodents or other pests. The housings 10 and 11 are preferably made of aluminum or other metal or metal alloy which contributes to the overall light weight characteristics of the subject transducer.

The housing 10 is equipped with an air inlet port 12 through which an external source of air under pressure is admitted to the device of this invention. In the disposition of the device as shown in the drawing a horizontal internal passageway 13 extends inwardly from the port 12 to the center of the housing 10. A vertical passageway 14 extends upwardly to the top of the housing 10 from its juncture with the horizontal passageway 13. A plug 15, preferably made of brass is threadedly engaged in the upper end of the vertical passageway 14. The passageway 14 may be used as an optional entry for air under pressure to the air modulator and filter housing 10. When that passageway is used the plug 15 would be removed and reinserted in the outer end of the horizontal passageway 13 at the present inlet port 12.

A plug 16, also preferably brass, is threadedly engaged in the housing 10 at a position intermediate the ends of the horizontal passageway 13. A generally vertically disposed cylindrical chamber 17 is provided in the housing 10 near the bottom and actually opening out through the bottom. A plug 18, again preferably brass, threadedly engages the housing at the lower end of the chamber 17. A relatively small diameter passage 19 is disposed in an inclined position and extends between the horizontal passageway 13 on one side of the plug 16 and down into the upper end of the chamber 17. A corresponding small diameter passage 20 is inclined in the opposite direction and extends between the horizontal passageway 13 on the other side of the plug 16 and thence down into the upper end of the chamber 17 adjacent the entry of the passageway 19. The chamber 17 is used as a filter or trap for impurities in the incoming air. The chamber may or may not include absorbent materials for the entrapment of such impurities. The mere geographical arrangement of the chamber 17 with the small diameter passageway connections 19 and 20 will in themselves act to filter the air prior to its return to the horizontal passageway 13 where it joins a continuing or reduced diameter end 21.

Clean air under pressure is delivered through the reduced diameter end extension 21 directly to a confined rotor chamber 22 within the housing 10. A rotor 23, preferably made of plastic and more particularly nylon, is cylindrical in shape and has a rotatable snug fit in the chamber 22. The rotor 23 is equipped with a central shaft 24 with the ends thereof journaled for rotation in the housing 10. Generally semi-cylindrical pockets are spaced around the circumference of the rotor 23 as shown at 25, 26, 27, 28, and 29. Although five such pockets have been shown it should be understood either a lesser or greater number of pockets may be employed to create the modulated or pulsating air blasts used to operate the ultrasonic transducer. As shown, the pockets are of varying depths and thus act to hold greater or lesser quantities of air under pressure. Such varying pocket sizes create varying frequencies of ultrasonics as will be hereafter described. An arcuate slot or undercut 30 is milled in the housing 10 around a portion of the rotor chamber 22. The arcuate slot 30 spans the space between at least two adjacent pockets at the point of discharge of the air from the rotor chamber. Air impinges on and causes a turning of the rotor 23 at the position of the nozzle or passageway 21. The pockets hold a quantity of the compressed air and at the location of the arcuate or undercut slot 30 the air so temporarily retained is discharged downwardly through a vertical passageway 31 located in the housing 10 and extending from the bottom of the rotor chamber to a bottom opening in the housing 10.

A connecting nipple 32, preferably made of brass, is threadedly engaged in the passageway 31 at its upper end and is threadedly engaged in the transducer housing 11 at its lower end. The transducer 11 has a vertically aligned passage 33 into which the nipple 32 threadedly engages. It is the adjoining nipple 32 that joins the housings 10 and 11 and makes them unitary.

A very small diameter vertical passage 34 joins the lower end of the passage 33 and further confines the air delivered thereto. This latter passage carries the pulsating air downwardly to a center or apex 35 of the transducer 11. The transducer employed is of the two ended horn type and is provided with frusto-conical shaped open ended chambers 36 and 37 on each side of the apex 35. The opposite ends of the transducer 11 are large and open and it is through these ends that the ultrasonic waves are discharged.

A resonator plug 38 is located within the apex of the transducer at a position generally diametrically opposed to the air inlet passage 34. It is the impingement of air under pressure on the resonator plug that causes the creation of ultrasonic waves for rodent control. More particularly the top of the resonator is shaped and contoured to generate high frequency sound waves. The top of the resonator 38 is provided with a narrow central flat strip 39 thereacross.

The narrow flat plane or strip 39 acts to space downwardly and outwardly sloping sides 40 and 41 on the top of the resonator plug 38. The jet stream of air from the nozzlelike passage 34 impinges directly on the plane 39 from where it is deflected downwardly and outwardly over the inclined sides 40 and 41. The closed bottom holes 42 and 43 are resonators which create ultrasonic waves as the pulsating blasts of air pass thereover. The space between the jet nozzle 34 and the top of the resonator plug is critical in the creation of rodent effective sound waves. The shank 44 is threaded for threaded engagement in the transducer housing 11. A screw-driver slot 45 in the bottom of the plug shank permits vertical adjustment of the plug. After experimenting with various spacings of the resonator plug from the air nozzle and the most effective spacing is secured, a lock nut is applied to the shank and drawn up tightly against the transducer housing 11. The resonator plug may be welded or otherwise fastened to the lock nut after it is found to be in the proper adjusted position. The plug and nut may then be removable as a unit for cleaning and servicing.

FIGS. 4 and 5 show an optional form of resonator plug 47. In lieu of the flat plane and inclined sides the alternative form of plug 47 is provided with a convex top 48. The central portion of the convex top is still solid and undrilled in the same manner as the flat narrow plane 39 of the plug 38. Flanking the solid center are generally parallel rows of drilled holes or cavities for the creation of sound waves as the jet air stream passes thereover. The one row includes aligned holes 49, 50 and 51 and the row on the other side of the top includes aligned holes 52, 53 and 54. Again, the plug has a threaded shank 55 for threaded engagement with the housing 11 and a screw-driver slot 56 in its bottom in the same manner as the plug 38. It is thus apparent that the plug 47 may be vertically adjusted relative to the air nozzle 34 and then locked by the lock nut 46. As previously stated the nut is preferably welded to the plug shank in its adjusted position.

OPERATION OF THE DEVICE

In order to control or eliminate rodents or other pests in an area the ultrasonic producing device of this invention is actuated. An external source of air under pressure is delivered to the inlet port 12. The air is filtered through the by-pass passages in and to the chamber 17 and air is thence delivered through a nozzle-like passage 21 at substantially a tangent to the pocketed rotor 23. The constant air stream causes a rotation of the rotor and simultaneously entraps compressed air in the pockets. The entrapped air is pulsatingly released from the pockets as those pockets reach the area of the undercut milled slot 30 and the housing discharge passage 31.

These intermittent blasts of air move downwardly through the connecting nipple 32 and thence through the passage 33 and into the confined nozzle 34. The nozzle thus delivers air at high pressures against the top of a resonator plug in the apex 35 of the transducer. The pulsating character of the air jet in combination with the particular resonator plug tops generate ultrasonic waves of constantly varying frequencies. These varying frequencies are most effective in rodent and pest control and eliminates to a great extent the rodents becoming acclimated to any particular frequency of ultrasonic waves.

I am aware that many details may be changed throughout a great range without departing from the principles of this invention and it should be understood that drawings merely show one acceptable embodiment of the invention.

What is claimed is:

1. An air operated ultrasonic transducer comprising a first housing, said housing having an inlet port adapted to receive air under pressure, a cylindrical rotor journaled for rotation within said housing, said rotor having spaced apart pockets in and around the circumference thereof, said housing having passage means directing incoming air at substantially a tangent to the rotor to impart driving rotation thereto and to simultaneously charge said rotor pockets with air under pressure, said housing having a discharge passage spaced from said rotor driving and pocket charging position and arranged and constructed to receive the discharge of air from the charged pockets of the rotor in a pulsating manner, a second housing, said second housing having an air incoming passage, means joining the first and second housings, said discharge passage of the first housing communicating with the air incoming passage of the second housing, an air stream nozzle in said second housing joined with the incoming passage, a resonator chamber in said second housing comprising an apex, outwardly flaring frusto conical chambers joining the apex on both sides thereof, said air stream nozzle directing pulsating blasts of air into the apex, a resonator plug, means mounting said resonator plug in said second housing, said resonator plug having an operating top projecting into said apex at a generally diametrically opposed position from the air nozzle, and means on the top of the resonator plug cooperating with the air nozzle to produce ultrasonic waves of constantly varying frequencies.

2. A device as set forth in claim 1 in which there is included a milled recess in said first housing adjacent the rotor and spanning the space between at least two rotor pockets at the location of the discharge passage in said first housing.

3. A device as set forth in claim 1 in which said means on the top of the resonator plug includes a solid central area and closed bottom holes in said top flanking at least two sides of the solid central area.

4. A device as set forth in claim 3 in which the solid central area includes a narrow flat plane strip across the top of the resonator plug and downwardly and outwardly sloping sides on said top flanking both sides of said narrow flat plane strip, and a closed bottom hole in each of said sloping sides.

5. A device as set forth in claim 3 in which said top is convex and the solid central portion thereof is flanked with a row of three closed bottom holes on each of two sides thereof.

6. A device as set forth in claim 1 in which the first housing is made of aluminum and the rotor journaled therein is plastic.

7. A device as set forth in claim 1 in which the pockets in the circumference of the rotor are generally semi-cylindrical in shape.

8. A device as set forth in claim 7 in which the rotor pockets are of different sizes to receive irregular charges of air under pressure.

9. A device as set forth in claim 1 in which there is included means in the first housing to filter said incoming air under pressure.

10. A device as set forth in claim 1 in which the means mounting the resonator plug in the second housing includes cooperative threads on the plug and the second housing.

* * * * *